United States Patent
Mitamura et al.

[19]

[11] Patent Number: 6,165,100
[45] Date of Patent: *Dec. 26, 2000

[54] HIGH-CLEANNESS STEEL AND TOROIDAL TYPE CONTINUOUSLY VARIABLE TRANSMISSION INCLUDING COMPONENTS SUCH AS INPUT/OUTPUT DISCS, POWER ROLLER AND CAM DISC USING THE HIGH-CLEANNESS STEEL

[75] Inventors: Nobuaki Mitamura; Tomonobu Yoshikawa; Yasuo Murakami, all of Fujisawa, Japan

[73] Assignees: NSK Ltd.; Sanyo Special Steel Co., Ltd., both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/187,607

[22] Filed: Nov. 6, 1998

[30] Foreign Application Priority Data

Nov. 10, 1997 [JP] Japan .................................. 9-307156
Apr. 15, 1998 [JP] Japan .................................. 10-104838

[51] Int. Cl.[7] .................................................. F16H 55/32
[52] U.S. Cl. .............................. 476/72; 476/70; 476/40
[58] Field of Search .................................. 476/72, 73, 40, 476/42, 46; 148/210, 218

[56] References Cited

U.S. PATENT DOCUMENTS

| | | |
|---|---|---|
| 5,256,213 | 10/1993 | Narai et al. . |
| 5,556,348 | 9/1996 | Kokubu et al. . |
| 5,855,531 | 1/1999 | Mitamura et al. .......................... 476/46 |
| 5,976,053 | 11/1999 | Kino et al. ................................. 476/73 |
| 6,029,714 | 2/2000 | Imamura et al. ......................... 138/177 |

FOREIGN PATENT DOCUMENTS

| | | |
|---|---|---|
| 4223659 A1 | 1/1993 | Germany . |
| 4431007 A1 | 3/1995 | Germany . |
| 19501391 A1 | 8/1995 | Germany . |
| 3-294435 | 12/1991 | Japan . |
| 7-208568 | 9/1995 | Japan . |
| 8-338493 | 12/1996 | Japan . |
| 9-079338 | 3/1997 | Japan . |

OTHER PUBLICATIONS

Murakami, Yukitaka, "Metal Fatigue: Effects of Small Defects and Nonmetallic Inclusions", *Inclusions Micro–defects and Inclusion,* Mar. 8, 1993.

*Primary Examiner*—David M. Fenstermacher
*Attorney, Agent, or Firm*—Christensen O'Connor Johnson Kindness PLLC

[57] ABSTRACT

At least one of input/output disks, a power roller and a cam disk of a toroidal type continuously variable transmission is formed of a high-cleanness steel in which a size of a maximum inclusion is estimated by the following extremum statistical process. In step S1, a plane including a central line of the high-cleanness steel is cut out in a direction of rolling of the high-cleanness steel. In step S2, a portion d of the cut-out cross-section, which is defined by 40% of a diameter D in the vicinity of the central line, is used as a to-be-tested surface. In step S3, a test reference area $S_0$ is set at an area not less than 300 mm² within the to-be-tested surface, and a root of an area of the maximum inclusion is measured five times or more. In step S4, a maximum inclusion distribution straight line is obtained. In step S5, the root, that is, the size of the area of the maximum inclusion within an estimation area S is estimated.

12 Claims, 9 Drawing Sheets

RELATIONSHIP BETWEEN $\sqrt{area}_{max}$ AND REPEATED BENDING STRESS

RESULTS OF DURABILITY TEST OF TOROIDAL TYPE CONTINUOUSLY VARIABLE TRANSMISSION

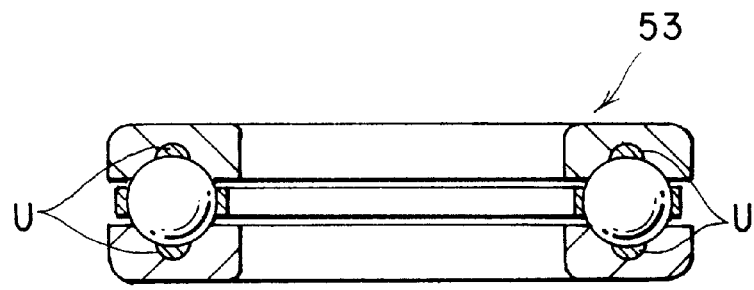
FIG. 15 PRIOR ART
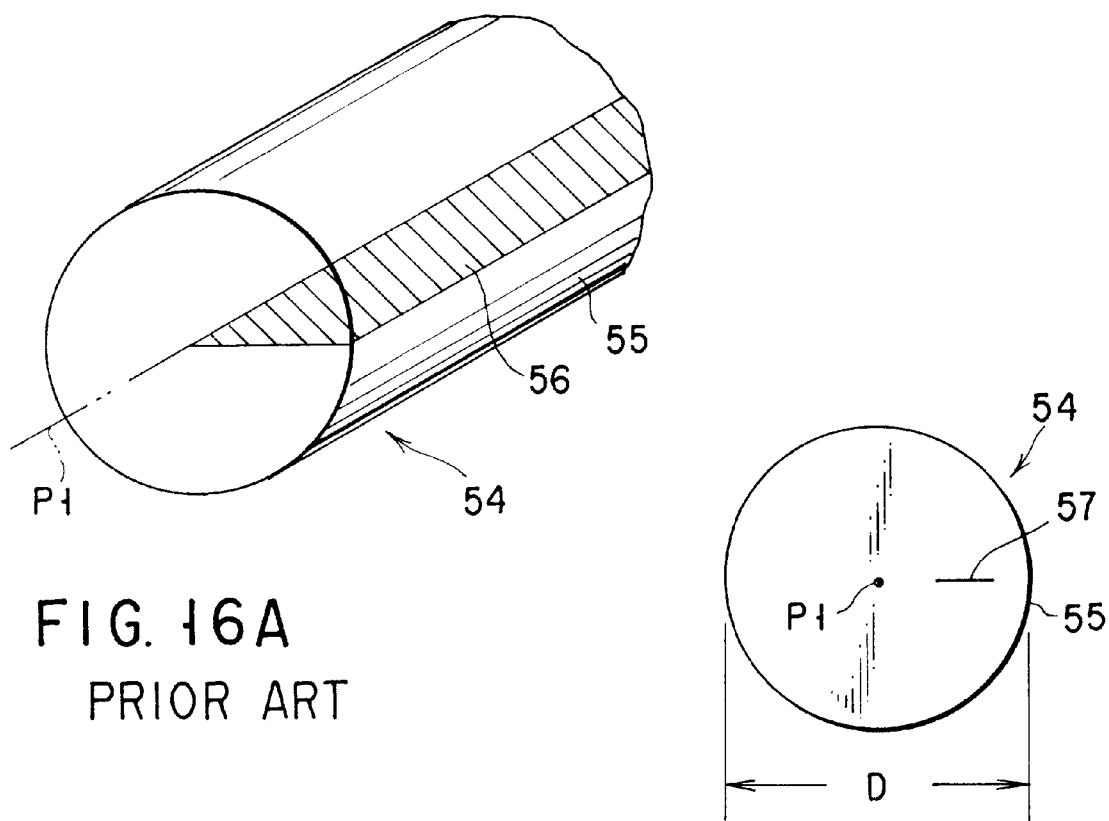
FIG. 16A PRIOR ART
FIG. 16B PRIOR ART

HIGH-CLEANNESS STEEL AND TOROIDAL TYPE CONTINUOUSLY VARIABLE TRANSMISSION INCLUDING COMPONENTS SUCH AS INPUT/OUTPUT DISCS, POWER ROLLER AND CAM DISC USING THE HIGH-CLEANNESS STEEL

BACKGROUND OF THE INVENTION

The present invention relates to high-cleanness steel in which the size of inclusion is controlled by an extremum statistical process, and to a toroidal type continuously variable transmission including an input disk, an output disk, a power roller and a cam disk all using the high-cleanness steel.

Speed change gears have mainly been used as conventional transmissions for vehicles such as automobiles. The speed change gears comprises a plurality of gears, and the engagement mode of the gears is varied to transmit torque from an input shaft to an output shaft. However, in the conventional speed change gears, torque is varied step-wise and discontinuously at the time of changing the speed. Thus, the speed change gears have drawbacks such as a loss in power transmission and vibration at the time of changing the speed.

Under the circumstances, a continuously variable transmission, in which torque is not varied stepwise or discontinuously at the time of changing the speed, has recently been put to practical use. In the continuously variable transmission, no vibration occurs at the time of changing the speed, and the loss in power transmission is less than that in the speed change gears. In addition, the continuously variable transmission is fuel-efficient when it is mounted in the vehicle. As an example of the continuously variable transmission, a belt type continuously variable transmission is mounted in some type of passenger cars.

On the other hand, as an another example of the continuously variable transmission, a toroidal type continuously variable transmission has been proposed. The toroidal type continuously variable transmission comprises an input shaft rotated by a drive source such as an engine, an input disk, an output disk, a power roller and a compression device. The input disk is supported on the input shaft and rotated in interlock with the input shaft. The output disk is supported on the input shaft so as to be opposed to the input disk and is rotated in interlock with the output shaft. The power roller is provided swingably between the input disk and the output disk and is rotatably put in contact with both disks. The compression device has a cam disk supported on the input shaft and urges at least one of the input and output disks in such a direction as to approach the input and output disks to each other.

As compared to the belt type continuously variable transmission, the toroidal type continuously variable transmission can transmit a higher torque. It is thus considered that the toroidal type continuously variable transmission is efficient as a continuously variable transmission for use in middle- and large-sized vehicles.

However, transmission of a higher torque is required in the toroidal type continuously variable transmission. Thus, compared to general mechanical components such as gears and bearings to which repeated stress is applied, much higher repeated bending stress and repeated shearing stress is applied to the input and output disks, power roller and cam disk. Accordingly, these disks, power roller and cam disk need to have higher durability than general mechanical components.

Some methods have been proposed to enhance the durability of the input/output disks, power roller and cam disk. For example, Jpn. Pat. Appln. KOKAI No. 7-208568 describes a method of subjecting to predetermined carburizing/carbonitriding the disks and power roller which are the components of the toroidal type continuously variable transmission. Jpn. Pat. Appln. KOKAI No. 8-338493 describes a method of hardening the disks and power roller. Jpn. Pat. Appln. KOKAI No. 9-79338 describes a method of adding special alloy elements to the disks and power roller. It is proposed by these methods to enhance the durability of the toroidal type continuously variable transmission by increasing the strength of the materials.

Besides, micro-defects and microcracks present in the material are factors of breakage. It is known that the degrees of micro-defects and microcracks greatly influence the strength of material against the repeated bending stress. For example, "Metal Fatigue, Influence of Micro-defects and Inclusion" (YOKENDO, 1993) describes that the fatigue limit σw of the material to which repeated bending stress is applied is expressed by the following equation (1):

$$\sigma w = \frac{K(Hv + 120)}{\left(\sqrt{area}\right)^{1/6}} \tag{1}$$

where

K:
  1.43 (in a case where the surface has defects or cracks)
  1.41 (in a case where defects or cracks are present adjacent to the surface)
  1.56 (in a case where defects or cracks are present inside)

σw: fatigue limit

Hv: hardness of material (relating to strength of material)

$\sqrt{area}$: root (representing the size and shape of defect or crack) of a projection area on which the defect or crack is projected in a maximum major stress direction.

According to equation (1), it is preferable that mechanical components of, e.g. the toroidal type continuously variable transmission which is used under severe conditions and receives great repeated bending stress and repeated shearing stress be formed of materials in which the size and distribution of micro-defects and microcracks are controlled.

It is generally known that a main defect of steel with high durability suitable for the input/output disks, power roller and cam disk of the toroidal type continuously variable transmission is an inclusion of non-metal oxide. The inclusion is impurities inevitably mixed in steep while the steel is produced through steps of melting, molding and rolling.

There are known some methods of controlling the inclusion, which conform to the JIS (Japanese Industrial Standard) method (JIS G 0555), ASTM (American Society for Testing and Material) method (ASTM E45).

In particular, as methods of controlling the inclusion in the material suitable for the disks, power roller and cam disk which require less inclusion and high cleanness, for example, Jpn. Pat. Appln. KOKAI Publication No. 3-294435 describes a method of controlling the cleanness of material and the above-mentioned "Metal Fatigue, Influence of Micro-defects and Inclusion" describes an extremum statistical process.

The method in Jpn. Pat. Appln. KOKAI Publication No. 3-294435, the material is re-melted by using electron beams and relatively large inclusion is floated, thereby controlling the cleanness of material.

In the extremum statistical process, the size of greatest inclusion within unit area $S_0$ of each of a plurality of test-pieces is examined and then a statistical process is performed, thereby estimating the size of greatest inclusion within an area ("estimation area" hereinafter) S which requires estimation.

In the extremum statistical process (see "Metal Fatigue, Influence of Micro-defects and Inclusion", Keigi MURAKAMI, Yokendo, Mar. 8, 1993, 1st ed. pp. 233–261), the size of greatest inclusion is estimated through the following steps.

At first, a plane in a test-piece, which is perpendicular to a major stress direction, is cut out. A surface of the cut-out plane (hereinafter referred to as "to-be-tested surface") is polished and mirror-finished. As the above-mentioned unit area $S_0$, a test reference area substantially equal to one visual field of an optical microscope or a camera is determined. The test reference area $S_0$ is an area per test-piece to be observed.

Thereafter, the to-be-tested surface is observed by the optical microscope or camera and a maximum inclusion in the test reference area $S_0$ is chosen. Root $\sqrt{\text{area}_{max}}$ of the area of the maximum inclusion is measured. The measurement of $\sqrt{\text{area}_{max}}$ of the maximum inclusion is repeated by n times such that the tested portion does not overlap. Root $\sqrt{\text{area}_{max}}$ of the area of the maximum inclusion indicates the size of the maximum inclusion.

The roots $\sqrt{\text{area}_{max}}$ of the areas of an n-number of measured maximum inclusions are arranged from the smallest one, and number j (j=1 to n) is added to each root. Using the following equations (2) and (3), cumulative distribution function $F_j$ (%) and standardization variable $y_j$ are calculated.

$$F_j = \{j/(n+1)\} \times 100 \quad (2)$$

$$y_j = -1n[-1n\{j/(n+1)\}] \quad (3)$$

The root $\sqrt{\text{area}_{max}}$ is indicated on the abscissa of an extremum probability sheet and $F_j$ and $y_j$ are indicated on the ordinate of the sheet. Data on the inclusions 1 to n is plotted on the extremum probability sheet. A maximum inclusion distribution straight line is calculated with respect to the standardization variable $y_j$ and $\sqrt{\text{area}_{max}}$. The maximum inclusion distribution straight line is expressed by the following equation (4):

$$\sqrt{\text{area}_{max}} = a \times y + b \quad (4)$$

where y: standardization variable, and a and b: constants.

The standardization variable y is expressed by the following equations (5) and (6):

$$y = -1n[-1n\{(T-1)/T\}] \quad (5)$$

$$T = (S+S_0)/S_0 \quad (6)$$

where

T: return period,

S: estimation area, and $S_0$: test reference area.

The estimation area S for estimating the size of the maximum inclusion is freely set and, using equations (4) to (6), the root $\sqrt{\text{area}_{max}}$ of the area of the maximum inclusion is estimated as the size of the maximum inclusion in the estimation area S.

By the above-described method of controlling the inclusion, the cleanness of the steel suitable for the functions of an anti-friction bearing or gears is controlled. However, as compared to a general anti-friction bearing 53 or gear shown in FIG. 15, a repeated stress with a high absolute value is applied to an input/output disk 50 (FIG. 12) and a power roller (FIG. 13), which are components of a single cavity type half toroidal continuously variable transmission or one type of toroidal continuously variable transmission, and to a cam disk 52 (FIG. 14) which is a component of a double cavity type half toroidal continuously variable transmission. For example, a contact pressure of about 4.0 GPa and a bending stress of about 90 kgf/mm² are applied to the disk 50 and power roller 51.

The volumes of portions S1, T1, S2 and T2 shown in FIGS. 12 to 14, where relatively large stress is applied, are greater than the volume of the portion U in FIG. 15 where relatively large stress is applied. In the cam disk 52 shown in FIG. 14, a high compressive stress acts on the portion encircled by a dot-and-dash line S2 and a high tensile stress acts on the portion encircled by a two-dot-and-dash line T2.

Under the circumstances, when the disk 50, power roller 51 and cam disk 52 of the toroidal type continuously variable are designed, a plurality of test-pieces of the disk 50, power roller 51 and cam disk 52 are formed. Different repeated stresses are applied to the test-pieces, and the number of repetition of stress until the destruction is found. An S-N graph is prepared by using a repeated stress and the number of repetition of stress.

The fatigue limits σw of the disk 50, power roller 51 and cam disk 52 are found from the S-N curve in the S-N graph. Then, the fatigue limits σw are divided by safety factors in the range from, e.g. 1.2 to 2.0. Thus, allowable stress of each of the disk 50, power roller 51 and cam disk 52 is found. The allowable stresses thus obtained are used for design.

Since the method of finding the allowable stress of each of the disk 50, power roller 51 and cam disk 52 by using the S-N graph is performed on a limited number of test-pieces, all defects in the material are not necessarily evaluated. Accordingly, in the method using the S-N graph, sufficient durability may not be obtained. In addition, in this method, the above-mentioned repeated tests have to be conducted each time the specifications of the toroidal type continuously variable transmission are changed. This may increase the time and cost of development of the toroidal type continuously variable transmission.

Steel 54 shown in FIGS. 16A and 16B is used as material of the disk 50, power roller 51 and cam disk 52. The steel 54 is shaped like a rod by rolling, etc. According to the method conforming to the aforementioned JIS method or ASTM method, when the steel 54 is relatively thin, a plane 56 including part of a surface 55 of steel 54 and a center line P1 is used as a to-be-tested plane.

On the other hand, when the steel 54 is relatively thick, as shown in FIG. 16B, a plane 57 extending in the direction of rolling of steel 54 and having a center at a midpoint between the center line P1 and surface 55 is used as a to-be-tested plane. According to the extremum statistical process, too, as described in the aforementioned "Metal Fatigue, Influence of Micro-defects and Inclusion", the to-be-tested plane is determined on the basis of the above-mentioned position.

In general, in the steel 54 formed in a rod by rolling, etc., the inclusion increases toward the central part of the steel 54 and the cleanness decreases. In the steel 54, the inclusion decreases toward the surface 55 and the cleanness increases.

According to the above-mentioned conventional JIS method, ASTM method and extremum statistical process, the portion near the surface 55 having high cleanness is included in the to-be-tested plane, and thus the cleanness of the steel 54 is averaged. As a result, in the conventional JIS method, ASTM method and extremum statistical process, the cleanness of the entire steel 54 used as material may be inexactly determined. That is, in the conventional JIS method, ASTM method and extremum statistical process, the cleanness of the central portion, which is actually low, may be determined to be high. Thus, it cannot be said that the size of the maximum inclusion is exactly estimated.

These methods are unsuitable, in particular, for testing the inclusion in the material of the mechanical components, such as disk 50, power roller 51 and cam disk 52 of the toroidal type continuously variable transmission, where the volumes of portions S1, T1, S2 and T2 receiving repeated stress are large and both central and surface portions receive relatively high repeated stress.

Therefore, in the toroidal type continuously variable transmission formed of steel, the cleanness of which is controlled by the above-described inclusion control method, the allowable stress at the time of strength design is not necessarily ensured.

BRIEF SUMMARY OF THE INVENTION

The object of the present invention, therefore, is to provide high-cleanness steel in which the size of a maximum inclusion is exactly estimated, and a toroidal type continuously variable transmission including components which are formed of the high-cleanness steel and ensures allowable stress at the time of strength design.

In order to achieve the object, there is provided a high-cleanness steel characterized in that a relationship between a size of a maximum inclusion in a test reference area $S_0$ measured by microscopic observation and a standardization variable y is subjected to an extremum statistical process, and an estimation value of the size, $\sqrt{area_{max}}$, of a maximum inclusion in an estimation area S=30000 mm$^2$, which is expressed by a relationship given by the following equation calculated by the extremum statistical process, is 50 μm or less:

$$\sqrt{area_{max}} = ay + b$$

where $\sqrt{area_{max}}$: a root of an area of a maximum inclusion present in the test reference area, y: a standardization variable, and a and b: constants, wherein the test reference area $S_0$ is an area of one test-piece for microscopic observation, an n-number of test-pieces are subjected to the microscopic observation, and when sizes, $\sqrt{area_{max}}$, of maximum inclusions obtained by the observation, are arranged in order from a smallest one, a standardization variable $y_j$ relative to a j-th $\sqrt{area_{max}}$ is expressed by $$y_j = -1n[-1n\{j/(n+1)\}]$$

and the standardization variable y relative to the estimation area S for estimating the size of the maximum inclusion is expressed by $$y = -1n[-1n\{(T-1)/T\}]$$

where T meets a relationship given by $$T = (S+S_0)/S_0.$$

In this invention, when the size, $\sqrt{area_{max}}$, of the maximum inclusion is estimated, the extremum statistical process in which the estimation area S is set at 30000 mm$^2$ or more is used. Thus, the high-cleanness steel is advantageous in that the size, $\sqrt{area_{max}}$, of the maximum inclusion is exactly estimated.

In the high-cleanness steel, the size, $\sqrt{area_{max}}$, of the maximum inclusion estimated when the estimation area S is set at 30000 mm$^2$ or more is 50 μm or less. Thus, the high-cleanness steel is advantageous in that it is strong against stress such as repeated bending stress.

Preferably, the test reference area $S_0$ is 300 mm$^2$ or more. In the high-cleanness steel, the size, $\sqrt{area_{max}}$, of the maximum inclusion is estimated by the extremum statistical process in which the estimation area S is set at 30000 mm$^2$ or more and the test reference area $S_0$ is 300 mm$^2$ or more. Thus, the high-cleanness steel is advantageous in that the size, $\sqrt{area_{max}}$, of the maximum inclusion is exactly estimated.

Moreover, there is provided a high-cleanness steel characterized in that a relationship between a size of a maximum inclusion in a test reference area $S_0$ measured by microscopic observation and a standardization variable y is subjected to an extremum statistical process, and an estimation value of the size, $\sqrt{area_{max}}$, of a maximum inclusion in an estimation area S=100000 mm$^2$, which is expressed by a relationship given by the following equation calculated by the extremum statistical process, is 70 μm or less:

$$\sqrt{area_{max}} = ay + b$$

where $\sqrt{area_{max}}$: a root of an area of a maximum inclusion present in the test reference area, y: a standardization variable, and a and b: constants, wherein the test reference area $S_0$ is an area of one test-piece for microscopic observation, an n-number of test-pieces are subjected to the microscopic observation, and when sizes, $\sqrt{area_{max}}$, of maximum inclusions obtained by the observation, are arranged in order from a smallest one, a standardization variable $y_j$ relative to a j-th $\sqrt{area_{max}}$ is expressed by $$y_j = -1n[-1n\{j/(n+1)\}]$$

and the standardization variable y relative to the estimation area S for estimating the size of the maximum inclusion is expressed by $$y = -1n[-1n\{(T-1)/T\}]$$

where T meets a relationship given by $$T = (S+S_0)/S_0.$$

In this invention, when the size, $\sqrt{area_{max}}$, of the maximum inclusion is estimated, the extremum statistical process in which the estimation area S is set at 100000 mm$^2$ or more is used. Thus, the high-cleanness steel is advantageous in that the size, $\sqrt{area_{max}}$, of the maximum inclusion is exactly estimated.

In the high-cleanness steel, the size, $\sqrt{area_{max}}$, of the maximum inclusion estimated when the estimation area S is set at 100000 mm$^2$ or more is 70 μm or less. Thus, the high-cleanness steel is advantageous in that it is strong against stress such as repeated bending stress.

Preferably, the test reference area $S_0$ is 300 mm$^2$ or more. In the high-cleanness steel, the size, $\sqrt{area_{max}}$, of the maximum inclusion is estimated by the extremum statistical process in which the estimation area S is set at 100000 mm² or more and the test reference area $S_0$ is 300 mm² or more. Thus, the high-cleanness steel is advantageous in that the size, $\sqrt{area_{max}}$, of the maximum inclusion is exactly estimated.

More preferably, the high-cleanness steel is formed in a rod, and a to-be-tested surface for actually measuring the maximum inclusion is defined within 40% of a distance between a central line extending in a longitudinal direction of the steel and a surface of the steel in the vicinity of the central line in a cross section including the central line. In the high-cleanness steel, the maximum inclusion is actually measured at the portion near the central line. Thus, the cleanness is not determined to be better than in the actual state. Therefore, in the high-cleanness steel, the size, $\sqrt{area_{max}}$, of the maximum inclusion can be exactly estimated.

There is also provided a toroidal type continuously variable transmission comprising:

an input shaft rotated by a driving source;

an input disk supported on the input shaft;

an output disk supported on the input shaft and opposed to the input disk;

a power roller swingably provided between the input disk and the output disk and rotatably put in contact with both disks; and a compression device having a cam disk supported on the input shaft, wherein at least one of the input disk, the output disk, the power roller and the cam disk is formed of a high-cleanness steel, characterized in that in the high-cleanness steel a relationship between a size of a maximum inclusion in a test reference area $S_0$ measured by microscopic observation and a standardization variable y is subjected to an extremum statistical process, and an estimation value of the size, $\sqrt{area_{max}}$, of a maximum inclusion in an estimation area S=30000 mm², which is expressed by a relationship given by the following equation calculated by the extremum statistical process, is 50 μm or less:

$$\sqrt{area_{max}} = ay + b$$

where $\sqrt{area_{max}}$: a root of an area of a maximum inclusion present in the test reference area, y: a standardization variable, and a and b: constants, wherein the test reference area $S_0$ is an area of one test-piece for microscopic observation, an n-number of test-pieces are subjected to the microscopic observation, and when sizes, $\sqrt{area_{max}}$, of maximum inclusions obtained by the observation, are arranged in order from a smallest one, a standardization variable $y_j$ relative to a j-th $\sqrt{area_{max}}$ is expressed by $$y_j = -\ln[-\ln\{j/(n+1)\}]$$

and the standardization variable y relative to the estimation area S for estimating the size of the maximum inclusion is expressed by $$y = -\ln[-\ln\{(T-1)/T\}]$$

where T meets a relationship given by $$T = (S+S_0)/S_0.$$

In the toroidal type continuously variable transmission, at least one of its constituents, the input disk, the output disk, the power roller and the cam disk, is formed of a high-cleanness steel in which an estimation value of the size, $\sqrt{area_{max}}$, of a maximum inclusion in an estimation area S=100000 mm² is 70 μm or less.

Specifically, in the toroidal type continuously variable transmission, at least one of its components, the input disk, the output disk, the power roller and the cam disk, is formed of a high-cleanness steel in which the size of a maximum inclusion is estimated by the extremum statistical process.

Thus, the volumes of, e.g. the input disk, the output disk, the power roller and the cam disk are converted to areas with slight thickness, and the roots of the areas of maximum inclusion in the areas obtained by the conversion are exactly estimated by the extremum statistical process.

Accordingly, there is no need to conduct repeated stress tests on test-pieces each time the specifications of the toroidal type continuously variable transmission, etc., and the increase in time and cost for development can be prevented.

Furthermore, using the aforementioned equation (1), the fatigue limit at a time when repeated bending stress is applied can be exactly estimated, and this may be reflected on the designing of the toroidal type continuously variable transmission.

More preferably, when the root of the area of the maximum inclusion is estimated by the extremum statistical process, the portion of the high-cleanness steel, which is defined within 40% of the distance between the central line and surface of the steel in the vicinity of the central line, is used as a to-be-tested surface. Thus, the size of the maximum inclusion in the input/output disk, power roller and cam disk can be exactly estimated.

More preferably, the test reference area $S_0$ in the extremum statistical process is set at 300 mm² or more. Thereby, the sizes of maximum inclusions obtained by testing to-be-tested surfaces at different positions of the same material do not vary among the to-be-tested surfaces. Since the number of times of measurement by the extremum statistical process is set at five or more, a variance in size of maximum inclusions obtained by testing several times the to-be-tested surfaces on the same material will decrease.

Besides, the value based on the volumes of the input/output disk, power roller and cam disk of the toroidal type continuously variable transmission, to which stress is applied, is used as the estimation area S. Thus, the size of the maximum inclusion in the input/output disk, power roller and cam disk can be exactly estimated.

It is preferable that the input/output disks, power roller and cam disk of the toroidal type continuously variable transmission be formed of a high-cleanness steel in which the estimation area is set at a value obtained by dividing the volume, to which stress is applied, by a resolution of the microscope. In this case, the size of the maximum inclusion among the inclusions in the disks, power roller and cam disk of the toroidal type continuously variable transmission can be estimated more exactly.

Accordingly, using the aforementioned equation (1), the allowable stress value at the time of designing the strength of the toroidal type continuously variable transmission is exactly ensured.

Furthermore, in the toroidal type continuously variable transmission, at least the input/output disks, power roller and cam disk is formed of the high-cleanness steel in which the estimation value of the root of area of the maximum inclusion at the time the estimation area S is set at 30000 mm² or more is 50 μm or less, or in which the estimation value of the root of area of the maximum inclusion at the time the estimation area S is set at 100000 mm$^2$ or more is 70 μm or less. In this case, the durability of the toroidal type continuously variable transmission is greatly enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 shows a conventional anti-friction bearing;

FIG. 16A is a perspective view of steel, of which the input/output disk, power roller and cam disk shown in FIGS. 12 to 14 are formed; and FIG. 16B is a front view of the steel, of which the input/output disk, power roller and cam disk shown in FIGS. 12 to 14 are formed.

DETAILED DESCRIPTION OF THE INVENTION

An embodiment of the present invention will now be described with reference to FIGS. 1 to 11.

Figure 1:
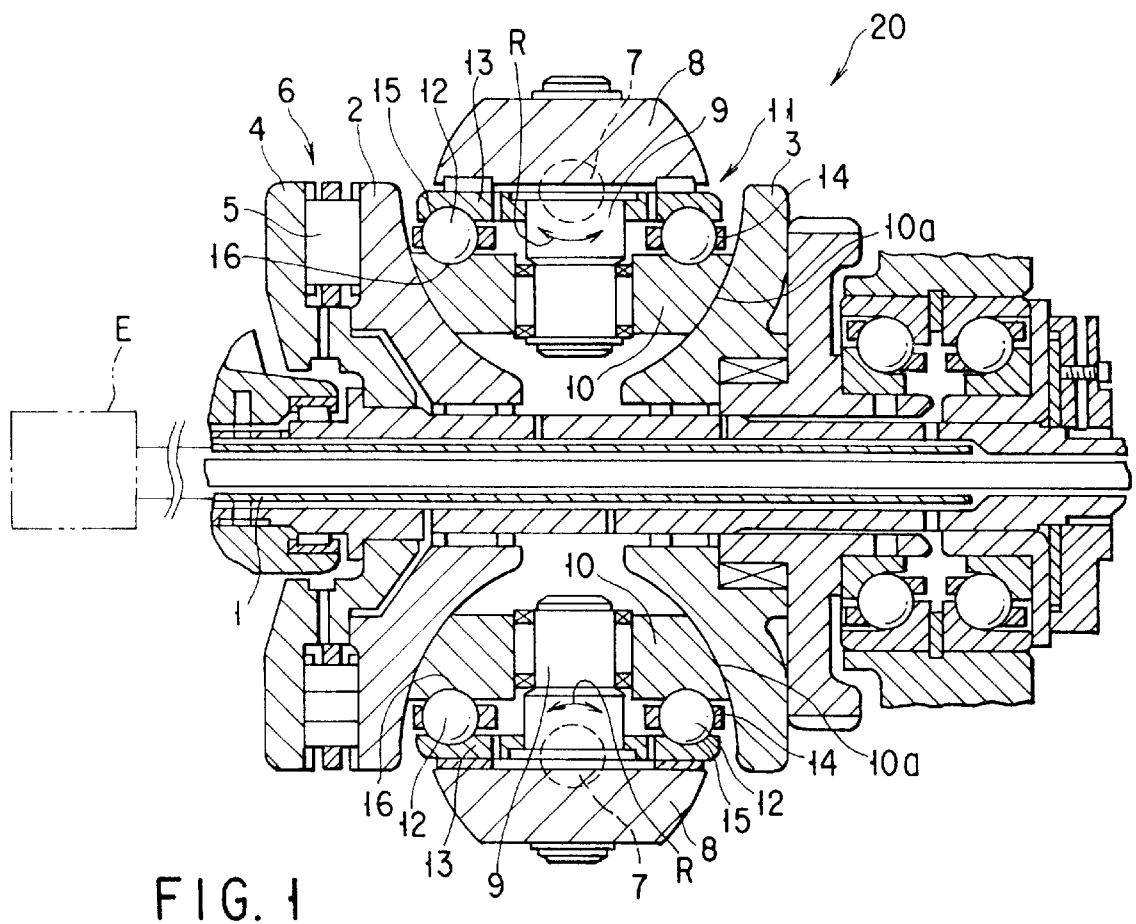
FIG. 1 is a vertical cross-sectional view showing part of a single cavity type half toroidal continuously variable transmission according to an embodiment of the present invention.
Figure 2:
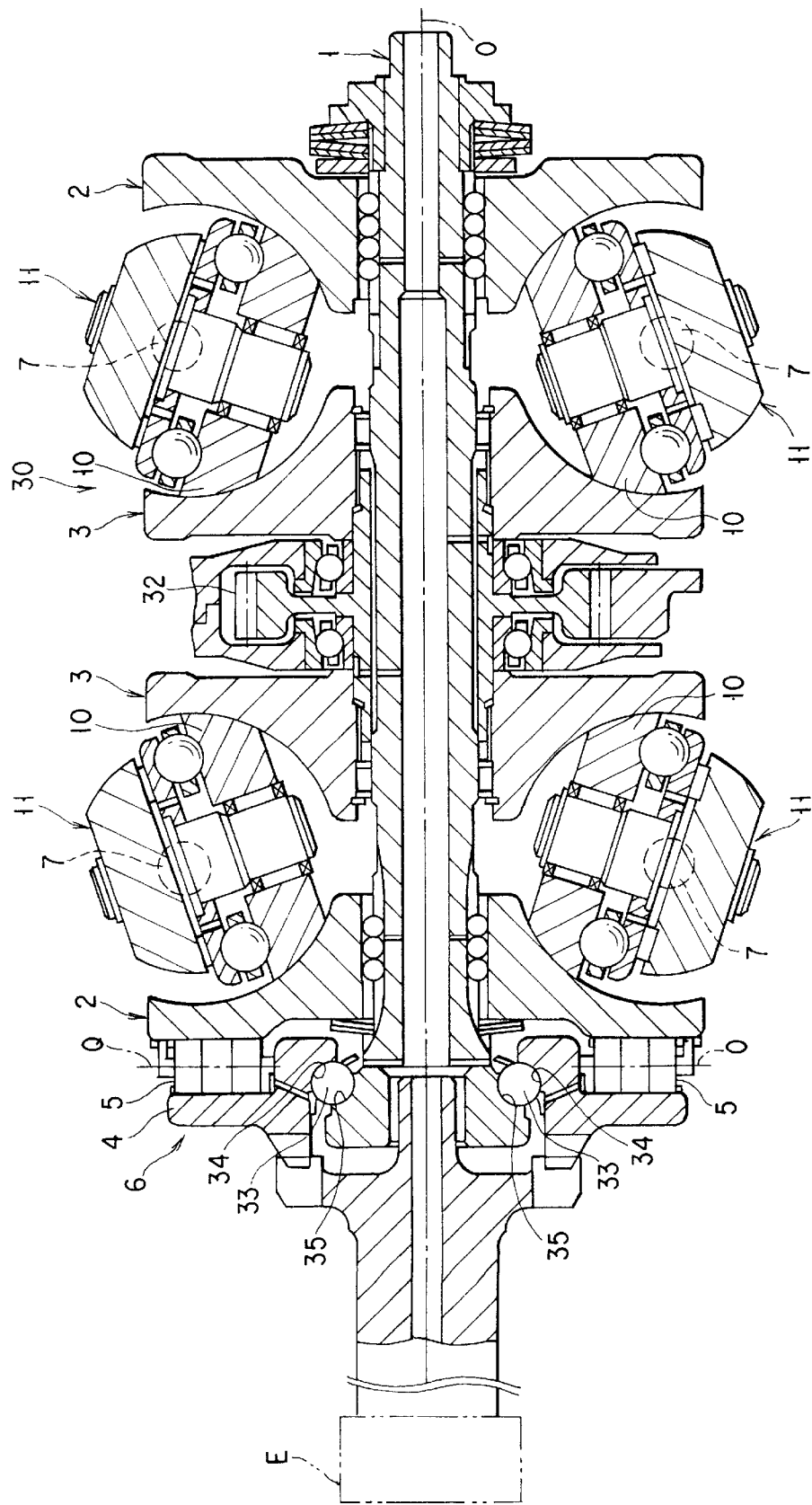
FIG. 2 is a vertical cross-sectional view showing part of a double cavity type half toroidal continuously variable transmission according to the embodiment of the present invention.

FIG. 1 is a cross-sectional view showing part of a single cavity type half toroidal continuously variable transmission 20 which is one type of toroidal type continuously variable transmission. FIG. 2 is a cross-sectional view showing part of a double cavity type half toroidal continuously variable transmission 30 which is another type of toroidal type continuously variable transmission.

As is shown in FIG. 1, the single cavity type half toroidal continuously variable transmission 20 comprises an input shaft 1 rotated by a drive source E such as an engine, an input disk 2, an output disk 3, a power roller 10 and a compression device 6.

The input disk 2 is supported on the input shaft 1 and rotated in interlock with the input shaft 1. The output disk 3 is supported on the input shaft 1 so as to be opposed to the input disk 2. The output disk 3 rotates in interlock with an output shaft which derives power from the torque of the input shaft 1.

The power roller 10 is swingably provided between the input disk 2 and output disk 3 and is rotatably put in contact with the disks 2 and 3. The compression device 6 is provided on the rear side of the input disk 2. The compression device 6 comprises a cam disk 4 and a cam roller 5 provided on the rear side of the input disk 2. The cam disk 4 and input disk 2 are splined to the input shaft 1 and rotate along with the input shaft 1. The cam roller 5 is provided between the cam disk 4 and input disk 2. In the compression device 6, the cam roller 5 is rotated to urge the input disk 2 towards the output disk 3. The input and output disks 2 and 3, power roller 10 and cam disk 4 are components of the toroidal type continuously variable transmission 20.

A trunnion 8 is provided between the input disk 2 and output disk 3. The trunnion 8 can swing on a shaft 7 in the direction of a double-headed arrow R in FIG. 1. A displacement shaft 9 is provided at a central portion of the trunnion 8. The power roller 10 is rotatably supported on the displacement shaft 9. The power roller 10 has a traction portion 10a which is rotatably put in contact with the input disk 2 and output disk 3. The power roller 10 can vary its inclination about the shaft 7 in the direction of arrow R between the input disk 2 and output disk 3 in accordance with a speed change ratio between the disks 2 and 3.

A ball thrust bearing 11 functioning as a power roller bearing is provided between the trunnion 8 and power roller 10. The ball thrust bearing 11 bears a load in a thrust direction applied to the power roller 10 from the input disk 2 and output disk 3, and permits rotation of the power roller 10. Balls 12 in the ball thrust bearing 11 are retained by an annular retainer 14. The retainer 14 is provided between an annular outer race 13 formed in the trunnion 8 and the power roller 10 functioning as a rotary portion.

The power roller 10 and outer race 13 have run grooves 15 and 16, respectively, for rotatably retaining the balls 12. The run grooves 15 and 16 are provided at contact faces between the power roller 10 and outer race 13 and the balls 12. The run grooves 15 and 16 are formed annular and have an arcuated cross section.

The double cavity type half toroidal continuously variable transmission 30 will now be described with reference to FIG. 2. The structural elements common to those of the single cavity type half toroidal continuously variable transmission 20 shown in FIG. 1 are denoted by like reference numerals and a description thereof is omitted.

As is shown in FIG. 2, the double cavity type half toroidal continuously variable transmission 30 comprises an input shaft 1 rotated by a drive source E such as an engine, a pair of input disks 2, a pair of output disk 3, a plurality of power rollers 10, and a compression mechanism 6.

The input disks are supported on the input shaft 1 and spaced apart, and opposed to, each other along an axis O of the input shaft 1. The input disks 2 are arranged coaxial to each other. The input disks 2 coaxially supported on the input shaft 1 so as to be rotated in interlock with the input shaft 1.

The output disks 3 are provided between the input disks 2 so as to be opposed to the input disks 2. The output disks 3 are loosely supported on the input shaft 1. The output disks 3 are arranged coaxial to each other and rotate in synchronism with each other. The output disks 3 are interlocked with an output gear 32 disposed coaxial to the output disks 3. The output gear 32 rotates in interlock with an output shaft which derives power from the input shaft 1.

Trunnions 8 are provided between the input disks 2 and output disks 3. The trunnions 7 swing on shafts 7. The power rollers 10 are supported on the trunnions 8 so as to be swingable on the shafts 7 provided between the input disks 2 and output disks 3. The power rollers 10 are rotatably put in contact with the associated input disks 2 and output disks 3.

The compression device 6 is provided on the rear side of one of the input disks 2. The compression device 6 comprises a cam disk 4 and a cam roller 5. The input and output disks 2 and 3, power rollers 10 and cam disk 4 are components of the toroidal type continuously variable transmission 30.

The cam disk 4 is disposed coaxial to the input disks 2. Balls 33 are provided between the cam disk 4 and input shaft 1. The cam disk 4 and input shaft 1 have guide grooves 34 and 35 each having an arcuated cross section at their portions contacting the balls 33.

The cam roller 5 is rotatable about an axis $\underline{O}$ crossing, e.g. at right angles, the axis O of the input shaft 1. In the compression device 6, the cam roller 5 is rotated about the axis $\underline{O}$ to urge the input disks 2 toward the output disks 3.

In the double cavity type half toroidal continuously variable transmission 30 having the above-described structure, the compression device 6 urges the input disks 2 towards the output disks 3. Thereby, the torque transmitted from the input shaft 1 is transmitted to the output shaft via the input disks 2, power roller 10, output disks 3 and output gear 32.

Figures 3A, 3B:
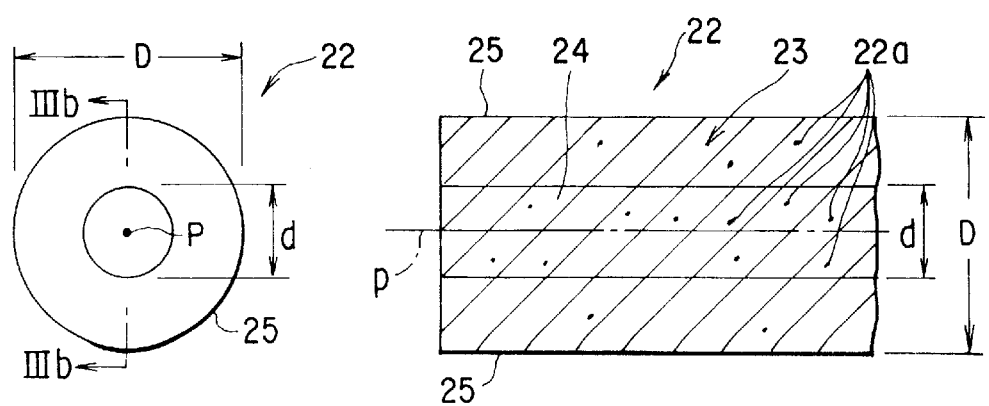
FIG. 3A is a front view of a high-cleanness steel of which input/output disks, a power roller and a cam disk of the toroidal type continuously variable transmissions shown in FIGS. 1 and 2 are formed.
FIG. 3B is a cross-sectional view of the high-cleanness steel, taken along line IIIB—IIIB in FIG. 3A.

At least one of the input disk 2, output disk 3, power roller 10, outer race 13 and cam disk 4 is formed of a high-cleanness steel 22 shown in FIG. 3. The high-cleanness steel 22 is formed in a rod by rolling, etc. The high-cleanness steel 22 includes inclusion 22a as impurities which are inevitably mixed in the manufacturing steps such as melting, molding and rolling. The inclusion 22a contains mainly a non-metal oxide. FIG. 3A shows an end face of the high-cleanness steel 22, and FIG. 3B is a cross-sectional view taken along line IIIb—IIIb in FIG. 3A.

The high-cleanness steel 22 is formed in a cylindrical shape with a diameter D not less than 30 mm and less than 100 mm. For example, where the diameter D of high-cleanness steel 22 is less than 30 mm, the inclusion 22a may be extended by the influence of rolling since the rolling ratio of steel 22 itself is high. Where the diameter D of high-cleanness steel 22 is less than 30 mm, it is expected that the inclusion 22a is relatively large. Thus, it is not preferable to manufacture the input/output disks 2 and 3, power roller 10, outer race 13 and cam disk 4 by using the high-cleanness steel 22 with diameter D of less than 30 mm.

For example, where the diameter D of high-cleanness steel 22 is not less than 100 mm, the material itself is too large. Thus, the sampling is not easy and the efficiency of tests may deteriorates. Accordingly, the disks 2, 3 and 4 and power roller 10 including relatively less inclusion 22a can be obtained by using the high-cleanness steel 22 formed cylindrical with diameter D not less than 100 mm and less than 100 mm. In addition, the efficiency of tests can be prevented from deteriorating by using the high-cleanness steel 22.

Figure 4:
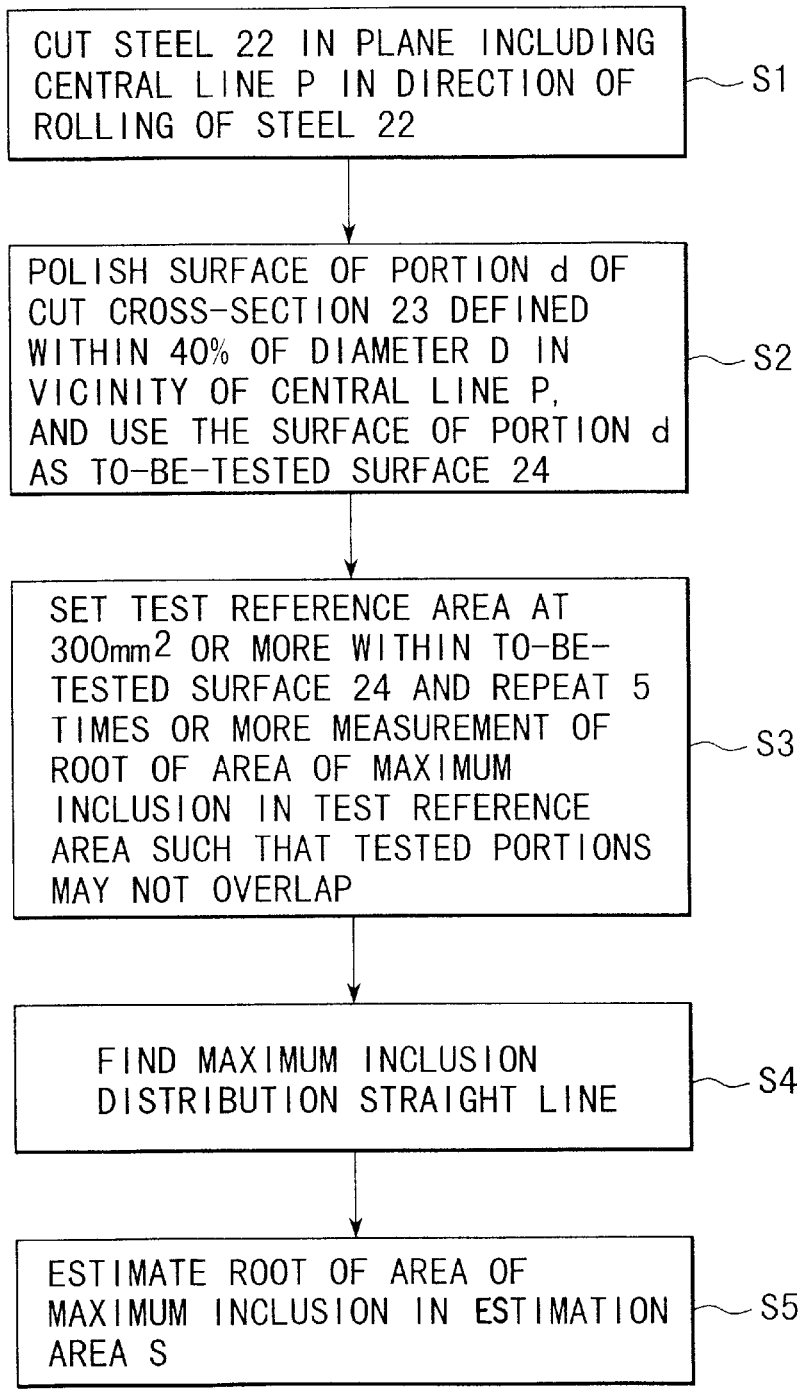
FIG. 4 is a flow chart illustrating a process of estimating the size of a maximum inclusion in the high-cleanness steel shown in FIG. 3.

The size of the maximum inclusion 22a in the high-cleanness steel 22 is estimated by the extremum statistical process illustrated in steps S1 to S5 in FIG. 4.

In step S1 in FIG. 4, the high-cleanness steel 22 is cut in a direction of rolling through a central line P in the direction of rolling. The central line P extends in the longitudinal direction of the high-cleanness steel 22.

In step S2, a surface 24 of a portion d of a cross section 23 (FIG. 3B) formed by the cutting, which portion d is defined within 40% of a diameter D in the vicinity of the central line P, is polished and mirror-finished. This surface 24 is used as a to-be-tested surface. In other words, the to-be-tested surface 24 is defined within 40% of a distance between the central line P and the surface 25 of high-cleanness steel 22 in the vicinity of the central line P in the cross section including the central line P of high-cleanness steel 22.

Figure 5:
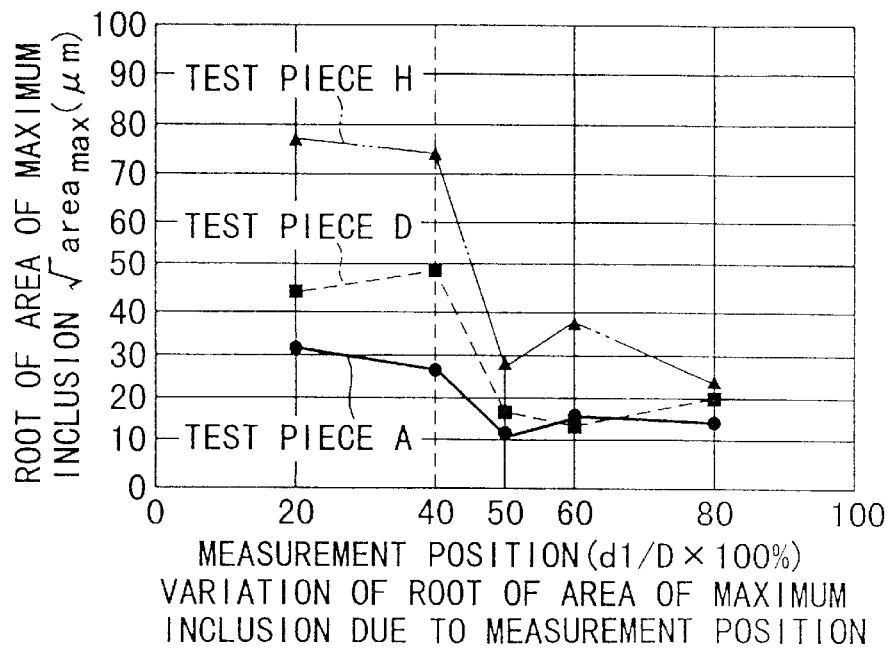
FIG. 5 shows variations in the roots of the areas of maximum inclusions in relation to positions of measurement in the high-cleanness steel shown in FIG. 3.

The reason why the portion d defined within 40% of the diameter D in the vicinity of central line P is used as the to-be-tested surface 24 is as follows. The inventors measured the size of inclusion 22a at different measurement positions on the cross section 23 including the central line P of the same high-cleanness steel 22. FIG. 5 shows the results of measurement of the size of inclusion 22a. In FIG. 5, symbol dl denotes a value obtained by doubling the distance between the central line P and the measurement position. According to the measurement results, it was found that as shown in FIG. 5, the inclusion 22a present in the vicinity of the central line P within 40% of the distance between the central line P and surface 25 of the high-cleanness steel 22 is large and the inclusion 22a present near the surface 25 is small.

In the measurement shown in FIG. 5, three test-pieces A, D and H which were different in conditions and steps of melting were used. In FIG. 5, test-piece A is SCM420 steel, test-piece D is SCr420 steel, and test-piece H is SCM420 steel.

If the portion near the surface 25 is included in the to-be-tested surface, as in the above-described conventional JIS method and ASTM method, the cleanness of the portion d of high-cleanness steel 22 would be determined to be better than in the actual state. The use of the to-be-tested surface including the portion near the surface 25 is not proper to the test of the inclusion in the material to be used for the mechanical components, such as input/output disks 2 and 3, power roller 10, outer race 13 and cam disk 4, which receive repeated stress in large volumes and suffer high repeated stress both at the central portion and surface portion. Therefore, by measuring the size of the inclusion 22a in the portion d, the size of the maximum inclusion in the high-cleanness steel 22 can be exactly estimated.

Moreover, the inventors actually manufactured the disks 2 and 3, power roller 10 and outer race 13 and conducted durability tests of the toroidal type continuously variable transmission 20, 30. According to the results of the durability tests, when the broken test-pieces were examined, it was found that the breakage began at points near the central line P of high-cleanness steel 22.

As has been described above, in order to ensure the cleanness of the material of the components, such as input/output disks 2 and 3, power roller 10, outer race 13 (especially power roller 10) and cam disk 4, which receive repeated stress in large volumes and suffer high repeated stress both at the central portion and surface portion, it is necessary to conduct tests with use of the portions having less cleanness. Therefore, the size of the maximum inclusion which becomes the beginning point of breakage can be exactly estimated by using, as to-be-tested surface 24, the portion d defined within 40% of diameter D in the vicinity of central line P.

In step S3, the test reference area $S_0$ is set at 300 mm² or more within the to-be-tested surface 24. With use of an optical microscope, etc., the root $\sqrt{area}_{max}$ of the area of the maximum inclusion, which is the size of the maximum inclusion in the test reference area $S_0$ being not less than 300 mm², is measured five times or more such that the tested portions may not overlap.

Figure 6:
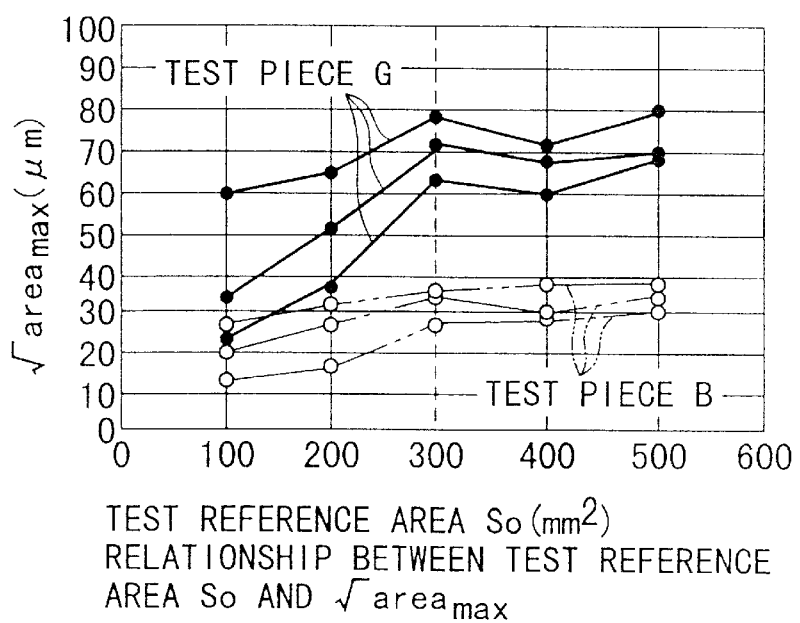
FIG. 6 shows the relationship between test reference areas and roots of areas of maximum inclusions when the sizes of the maximum inclusions in the high-cleanness steel shown in FIG. 3 are estimated by an extremum statistical process.

The reason why the test reference area $S_0$ is set at 300 mm² or more is as follows. The inventors estimated the root $\sqrt{area}_{max}$ of the area of the maximum inclusion, while varying the size of test reference area $S_0$ in the same high-cleanness steel 22. The inventors estimated the root $\sqrt{area}_{max}$ of the area of the maximum inclusion by the extremum statistical process several times for the test reference area $S_0$ of one size. FIG. 6 shows results of estimation of the root $\sqrt{area}_{max}$ of the area of the maximum inclusion.

As shown in FIG. 6, it is found that the value of $\sqrt{area}_{max}$ obtained by the extremum statistical process varied when the test reference area $S_0$ was less than 300 mm². It was found that the value of $\sqrt{area}_{max}$ varied less when the test reference area $S_0$ was not less than 300 mm². Accordingly, the size of the maximum inclusion can be exactly estimated by setting the test reference area $S_0$ at 300 mm² or more.

In the estimation, two kinds of test-pieces B and G with different conditions and steps at the time of melting were used. With respect to the test reference area $S_0$ of one size, $\sqrt{area}_{max}$ was estimated three times. Both test-pieces B and G are Scr420 steel.

The reason why the number of times of measurement is set at five or more is as follows. The inventors estimated the root $\sqrt{area}_{max}$ of the area of the maximum inclusion in the same high-cleanness steel 22 by varying the number of times of measurement. The root $\sqrt{area}_{max}$ of the area of the maximum inclusion was estimated several times as the number of times of measurement.

Figure 7:
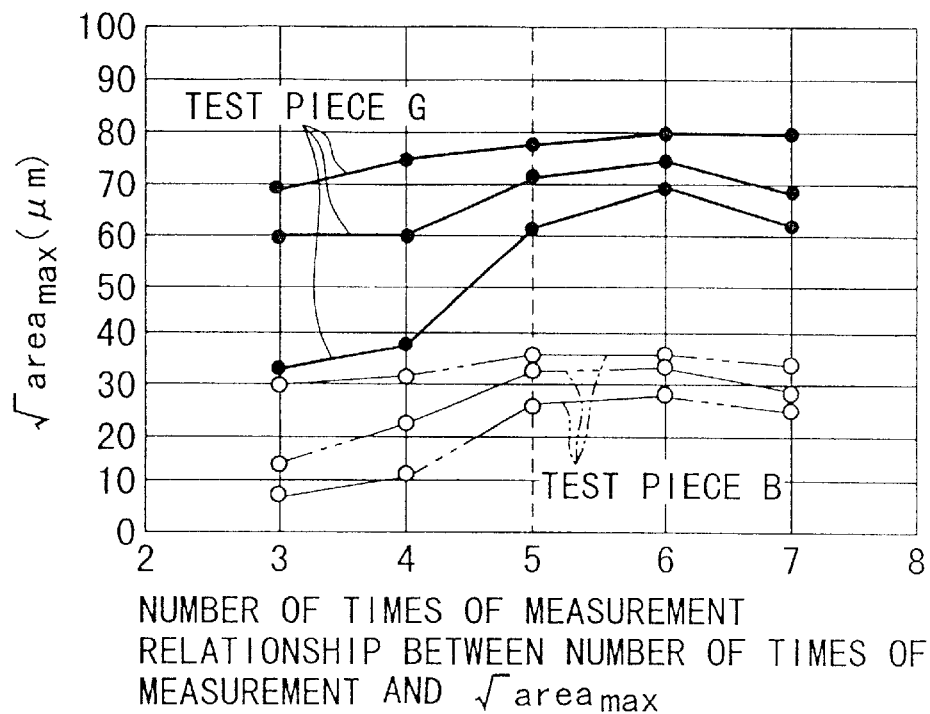
FIG. 7 shows the relationship between the number of times of measurement and roots of areas of maximum inclusions when the sizes of the maximum inclusions in the high-cleanness steel shown in FIG. 3 are estimated by an extremum statistical process.
Figure 8:
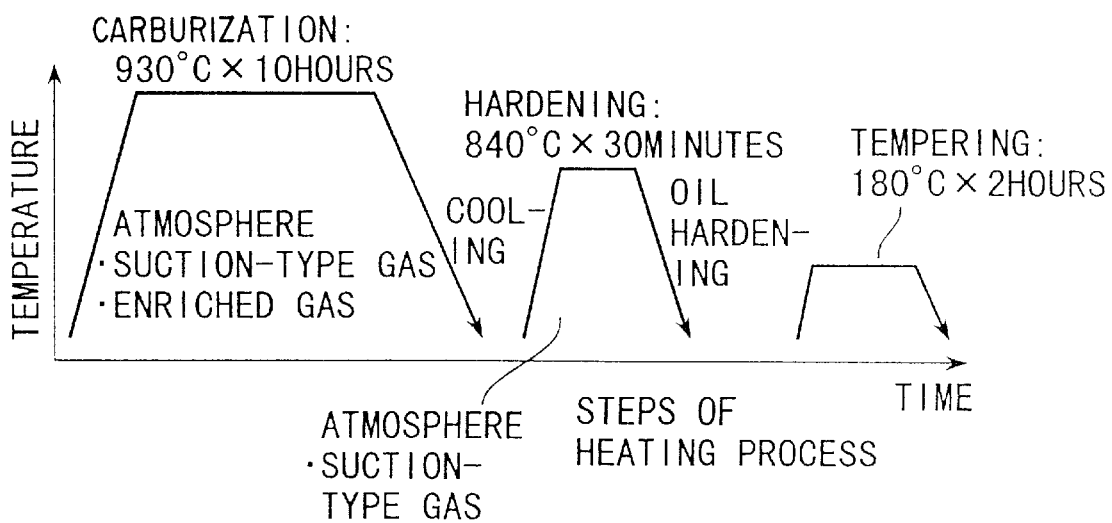
FIG. 8 illustrates steps of a heating process applied to test-pieces used in repeated bending tests and test-pieces used in durability tests of the toroidal type continuously variable transmission.

As is shown in FIG. 7, it was found that when the number of times of measurement was less than five, the value of $\sqrt{area}_{max}$ obtained by the extremum statistical process varied. It was found that when the number of times of measurement was five or more, the variance in value of $\sqrt{area}_{max}$ decreased. Accordingly, the size of the maximum inclusion can be exactly estimated by setting the number of times of measurement at five or more. In the estimation, the results of which are shown in FIG. 7, the same test-pieces B and G as in the case of FIG. 6 were used, and $\sqrt{area}_{max}$ was estimated three times as the number of times of estimation.

In step S4, the values of $\sqrt{area}_{max}$ of the area of the maximum inclusion measured five times or more are arranged in order from the smallest one, and the maximum inclusion distribution straight line expressed by equation (4) is found on the basis of equations (2), (3), (5) and (6).

In step S5, the estimation area S for estimating the size of the maximum inclusion is set at value not less than 30000 mm². Using the maximum inclusion distribution straight line, the root $\sqrt{area}_{max}$ of the area of the maximum inclusion, which is the size of the maximum inclusion in the estimation area S, is estimated.

For example, if the estimation area S is set at a relatively small value, the difference among materials in the estimated size of maximum inclusion becomes small and discrimination of the materials becomes difficult. Thus, the size of the maximum inclusion can be estimated by setting the estimation area S at 30000 mm² or more. If the estimation area S is set at a relatively high value, the estimated size of the maximum inclusion becomes too large, compared to the actual size. It is preferable, therefore, to use, as the estimation area S, the value based on the volumes of the input/output disks 2 and 3, power roller 10, outer race 13 and cam disk 4.

For example, it is preferable to use, as estimation area S, the area obtained by dividing the volumes of the input/output disks 2 and 3, power roller 10, outer race 13 and cam disk 4 by the resolution of the test device such as optical microscope used in the test of the inclusion. As regards the illustrated example, when the volumes of the input/output disks 2 and 3, power roller 10, outer race 13 and cam disk 4 was divided by the resolution of the test device, 100000 mm² was obtained as estimation area S.

The inventors then conducted rotary bending tests of the equivalents of the toroidal type continuously variable transmissions 20 and 30 by using test-pieces A to H of eight kinds of materials. The test-pieces A to H are formed of SCM 420 steel or SCr420 steel with different conditions, steps and compositions at the time of melting. TABLE 1 shows the test results. TABLE 1 shows, as well as the test results, roots $\sqrt{area}_{max}$ of the areas of the maximum inclusions estimated by the extremum statistical process.

TABLE 1

| No. | Kind | $\sqrt{area_{max}}$ Estimated by Extremum Statistical Process at S = 30000 mm² (μm) | $\sqrt{area_{max}}$ Estimated by Extremum Statistical Process at S = 100000 mm² (μm) | Breakage Stress (Bending Stress) at Number of Repetition = 10⁷ cycles (MPa) | Roof of Area Inclusion that Caused Breaking in Rotary Bending Tests (μm) |
|---|---|---|---|---|---|
| TEST PIECE A | SCM420 | 28 | 32 | 1170 | 34 |
| TEST PIECE B | SCr420 | 33 | 38 | 1160 | 35 |
| TEST PIECE C | SCM420 | 42 | 48 | 1140 | 47 |
| TEST PIECE D | SCr420 | 48 | 55 | 1130 | 53 |
| TEST PIECE E | SCM420 | 56 | 65 | 1020 | 71 |
| TEST PIECE F | SCM420 | 66 | 78 | 960 | 76 |
| TEST PIECE G | SCr420 | 71 | 85 | 900 | 79 |
| TEST PIECE H | SCM420 | 80 | 95 | 810 | 86 |

The roots $\sqrt{area_{max}}$ of the areas of the maximum inclusions estimated by the extremum statistical process, as shown in TABLE 1, are estimated under the following conditions. The high-cleanness steel 22 with diameter D of 60 mm was used, the test reference area $S_0$ was 300 mm², and the number of times of measurement n was 10. The estimation area S was set at 100000 mm² and at 30000 mm².

The estimation area S of 100000 mm² was used since it was a value obtained by dividing the volume of each test-piece of the rotary bending test, to which stress is applied, by the resolution of the test device such as an optical microscope.

The test-pieces A to H are formed as test-pieces No. 1 defined in JIS (Japanese Industrial Standard) Z2274, with the size of d=8 mm, R=24 mm and L=17 mm. Each of the test-pieces A to H was subjected to a heating process illustrated in FIG. 8.

The above-mentioned rotary bending test is based on the ONO-type rotary bending test described in "ZAIRYO SHIKEN BINRAN" ("Material Test Handbook"), 1957, Nippon Zairyo Shiken Kyokai (Japan Material Test Society), Maruzen.

A repeated bending stress was applied to each of the test-pieces A to H in TABLE 1, and an S-N diagram of each of test-pieces A to H was prepared. In the tests, a breakage stress (bending stress) at the number of repetition of 10⁷ cycles was found. Breakage appears to occur from the maximum inclusion as a beginning point.

Thus, after the test-pieces A to H were broken, the size (average of roots of area) of the maximum inclusion, which was the beginning point of breakage of each of the test-pieces A to H, was measured. By measuring the size of the inclusion which was the beginning point of breakage, the size of the maximum inclusion of each of test-pieces A to H was measured.

According to these tests, as shown in TABLE 1, it was found that the roots $\sqrt{area_{max}}$ of the areas of maximum inclusions obtained by the extremum statistical process when the estimation area S was 100000 mm² were substantially equal to those of the areas of maximum inclusions which were the beginning points of breakage.

Accordingly, it was found that the size of the maximum inclusion in each test-piece can be exactly estimated by using the value obtained by dividing the volume, to which repeated stress is actually applied, by the resolution of the test device such as an optical microscope.

Furthermore, by using the high-cleanness steel 22 having the estimated maximum inclusion and by finding the fatigue limit σw based on equation (1), it becomes possible to ensure the allowable stress at the time of strength design of the mechanical components such as input/output disks 2 and 3, power roller 10, outer race 13 and cam disk 4, to which relatively high repeated bending stress is applied.

Figure 9:
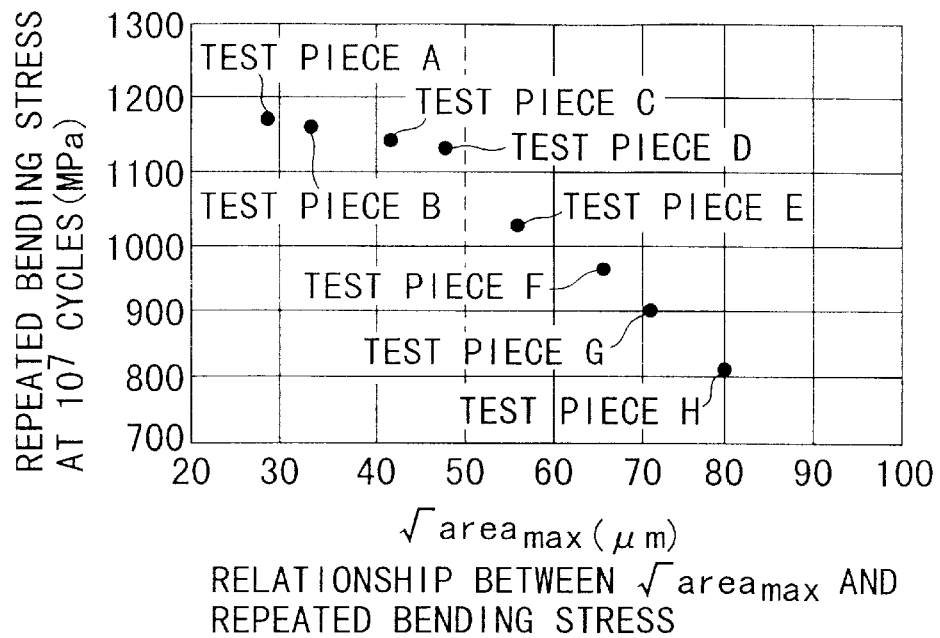
FIG. 9 shows a relationship between repeated bending stress and the root of area of maximum inclusion.

FIG. 9 shows a relationship between the root $\sqrt{area_{max}}$ of the area of maximum inclusion in a case where the estimation area S is 30000 mm² in the rotary bending tests and the breakage stress (bending stress) when the number of repetition is 10⁷ cycles.

In FIG. 9, the roots $\sqrt{area_{max}}$ of the areas of the estimated maximum inclusion vary among the test-pieces. It is thus clarified that the materials can be discriminated by estimating the root $\sqrt{area_{max}}$ of the area of the maximum inclusion by the extremum statistical process under the conditions in which the test reference area $S_0$ is set at 300 mm² and the estimation area S is set at 30000 mm² in the cylindrical high-cleanness steel 22 with the diameter of 60 mm.

Therefore, it is clear that the size of the maximum inclusion can be exactly estimated and the materials can be discriminated, if the test reference area $S_0$ in the extremum statistical process is set at 300 mm² and the estimation area S is set at 30000 mm² in the cylindrical high-cleanness steel 22 with the diameter not less than 30 mm and less than 100 mm.

Moreover, according to FIG. 9, it is clarified that if the root $\sqrt{area_{max}}$ of the area of the maximum inclusion, which is obtained by the extremum statistical process when the estimation area S is set at 30000 mm² or more, is set at 50 μm or less, the material with high strength against repeated bending stress can be obtained. It is clarified that the input/output disks 2 and 3, power roller 10, outer race 13 and cam disk 4 which are strong against repeated bending stress can be obtained by using the material in which the root $\sqrt{area_{max}}$ of the area of the maximum inclusion is 50 μm or less.

Then, the inventors conducted durability tests of the half toroidal type continuously variable transmission 20 by using the input/output disks 2 and 3, power roller 10 and outer race 13 formed with use of eight kinds of steels (test-pieces A to H) shown in TABLE 1.

In the durability tests, test-pieces A to H of the input/output disks 2 and 3, power roller 10 and outer race 13 of the half toroidal continuously variable transmission 20 were formed of eight kinds of steels shown in TABLE 1. The input/output disks 2 and 3, power roller 10 and outer race 13, which are used as the test-pieces A to H, were subjected to the heating process illustrated in FIG. 8. The time of cementation is set at a time with which a necessary hardened layer depth in each part can be obtained.

The tests are based on the double cavity type toroidal continuously variable transmission shown in FIG. 3 of "Research on Toroidal CVT for Automobile" (Japan Machine Society, Lectures of the Element Lubrication Design Department, July 1997). In the tests, the input torque was set at 340 N.m, the rotation speed at the time of input was set at 4000 rpm, and power roller 10 was set in a maximum deceleration state. Three tests were conducted for each of test-pieces A to H. The test results are shown in TABLE 2 and FIG. 10.

In TABLE 2, power roller breakage indicates breakage of either power roller 10 or outer race 13. In most cases, the power roller 10 is broken.

Next, the inventors conducted durability tests of the toroidal type continuously variable transmission 30 by using the cam disks 4 of the toroidal type continuously variable transmission 30 which are formed of eight kinds of steels (test-pieces A to H) shown in TABLE 1.

TABLE 2

| No. | $\sqrt{area_{max}}$ Estimated by Extremum Statistical Process at S = 30000 mm² (μm) | $\sqrt{area_{max}}$ Estimated by Extremum Statistical Process at S = 100000 mm² (μm) | TEST RESULTS | | |
|---|---|---|---|---|---|
| TEST PIECE A | 28 | 32 | 100 hours No Breakage | After 77.0 hours Disk Breakage | After 55.0 hours Power Roller Breakage |
| TEST PIECE B | 33 | 38 | After 62.0 hours Disk Breakage | After 79.0 hours Disk Breakage | After 50.0 hours Disk Breakage |
| TEST PIECE C | 42 | 48 | After 42.3 hours Power Roller Breakage | 100 hours No Breakage | After 68.0 hours Disk Breakage |
| TEST PIECE D | 48 | 55 | After 46.3 hours Power Roller Breakage | After 52.1 hours Disk Breakage | After 63.0 hours Disk Breakage |
| TEST PIECE E | 56 | 65 | After 17.3 hours Disk Breakage | After 67.1 hours Disk Breakage | After 26.0 hours Power Roller Breakage |
| TEST PIECE F | 66 | 78 | After 28.1 hours Power Roller Breakage | After 5.5 hours Disk Breakage | After 33.0 hours Power Roller Breakage |
| TEST PIECE G | 71 | 85 | After 6.0 hours Disk Breakage | After 7.2 hours Power Roller Breakage | After 19.3 hours Disk Breakage |
| TEST PIECE H | 80 | 95 | After 3.4 hours Disk Breakage | After 6.8 hours Disk Breakage | After 10.9 hours Power Roller Breakage |

Figure 10:
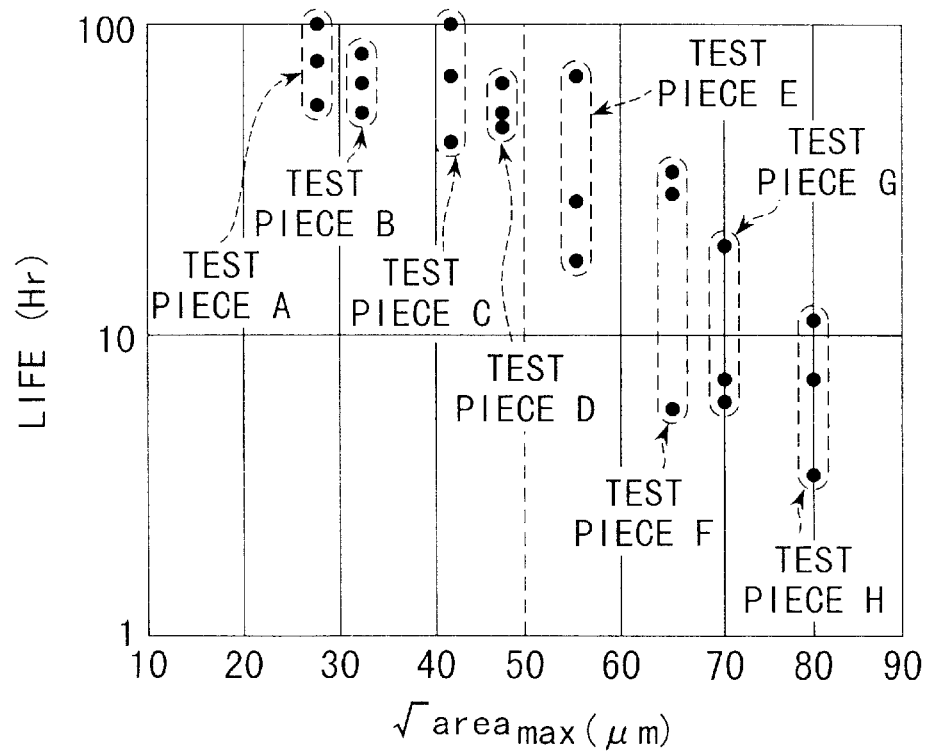
FIG. 10 shows results of durability tests of the toroidal type continuously variable transmission.

According to the test results shown in TABLE 2 and FIG. 10, it was found that test-pieces A to D, in which the estimation area S is 30000 mm² and the root $\sqrt{area_{max}}$ of the area of the maximum inclusion is 50 μm or less, have a relatively long life. Accordingly, it is possible to obtain the input/output disks 2 and 3, power roller 10 and outer race 13 of the half toroidal type continuously variable transmission 20, which have a relatively long life, by using the material in which the root $\sqrt{area_{max}}$ of the area of the maximum inclusion, which is the estimation value obtained by the extremum statistical process wherein the estimation area S is set at 30000 mm², is 50 μm or less.

According to TABLE 2, it is clear that the test-pieces A to E, wherein the estimation area S is 100000 mm² and the root $\sqrt{area_{max}}$ of the area of the maximum inclusion is 70 μm or less, have a relatively long life. Therefore, it is possible to obtain the input/output disks 2 and 3, power roller 10 and outer race 13 of the half toroidal type continuously variable transmission 20, which have a relatively long life, by using the material in which the root $\sqrt{area_{max}}$ of the area of the maximum inclusion, which is the estimation value obtained by the extremum statistical process wherein the estimation area S is set at 100000 mm², is 70 μm or less.

In the durability tests, samples of cam disk 4 of toroidal type continuously variable transmission 30 were formed of eight kinds of steels in TABLE 1, and the samples were used as test-pieces AA to HH. The cam disks 4 used as test-pieces AA to HH were subjected to the heating process illustrated in FIG. 8. The time of cementation is set at a time with which a necessary hardened layer depth in each component can be obtained.

The tests are based on the double cavity type toroidal continuously variable transmission shown in FIG. 3 of "Research on Toroidal CVT for Automobile" (Japan Machine Society, Lectures of the Element Lubrication Design Department, July 1997, p. 532).

In the tests, the input torque was varied in a sine-wave manner between −340 N.m and +340 N.m, and the rotation speed at the time of input was set at 4000 rpm. The number of cycles up to breakage of the cam disk 4 was examined. Three tests were conducted for each of test-pieces AA to HH. The test results are shown in TABLE 3 and FIG. 11.

TABLE 3

| No. | $\sqrt{area_{max}}$ Estimated by Extremum Statistical Process at S = 30000 mm² (μm) | $\sqrt{area_{max}}$ Estimated by Extremum Statistical Process at S = 100000 mm² (μm) | TEST RESULTS | | |
|---|---|---|---|---|---|
| TEST PIECE AA | 28 | 32 | After $1 \times 10^7$ Cycles No Breakage | After $1 \times 10^7$ Cycles No Breakage | After $1 \times 10^7$ Cycles No Breakage |
| TEST PIECE BB | 33 | 38 | After $1 \times 10^7$ Cycles No Breakage | After $1 \times 10^7$ Cycles No Breakage | After $7.8 \times 10^6$ Cycles Breakage |
| TEST PIECE CC | 42 | 48 | After $1 \times 10^7$ Cycles No Breakage | After $1 \times 10^7$ Cycles No Breakage | After $1 \times 10^7$ Cycles No Breakage |
| TEST PIECE DD | 48 | 55 | After $7.2 \times 10^6$ Cycles Breakage | After $1 \times 10^7$ Cycles No Breakage | After $1 \times 10^7$ Cycles No Breakage |
| TEST PIECE EE | 56 | 65 | After $8.2 \times 10^6$ Cycles Breakage | After $1 \times 10^7$ Cycles No Breakage | After $1.2 \times 10^6$ Cycles Breakage |
| TEST PIECE FF | 66 | 78 | After $8.5 \times 10^5$ Cycles Breakage | After $6.5 \times 10^6$ Cycles Breakage | After $1 \times 10^7$ Cycles No Breakage |
| TEST PIECE GG | 71 | 85 | After $3.5 \times 10^6$ Cycles Breakage | After $1 \times 10^7$ Cycles No Breakage | After $1.1 \times 10^6$ Cycles Breakage |
| TEST PIECE HH | 80 | 95 | After $6.5 \times 10^5$ Cycles Breakage | After $5.8 \times 10^6$ Cycles Breakage | After $3.5 \times 10^5$ Cycles Breakage |

Figure 11:
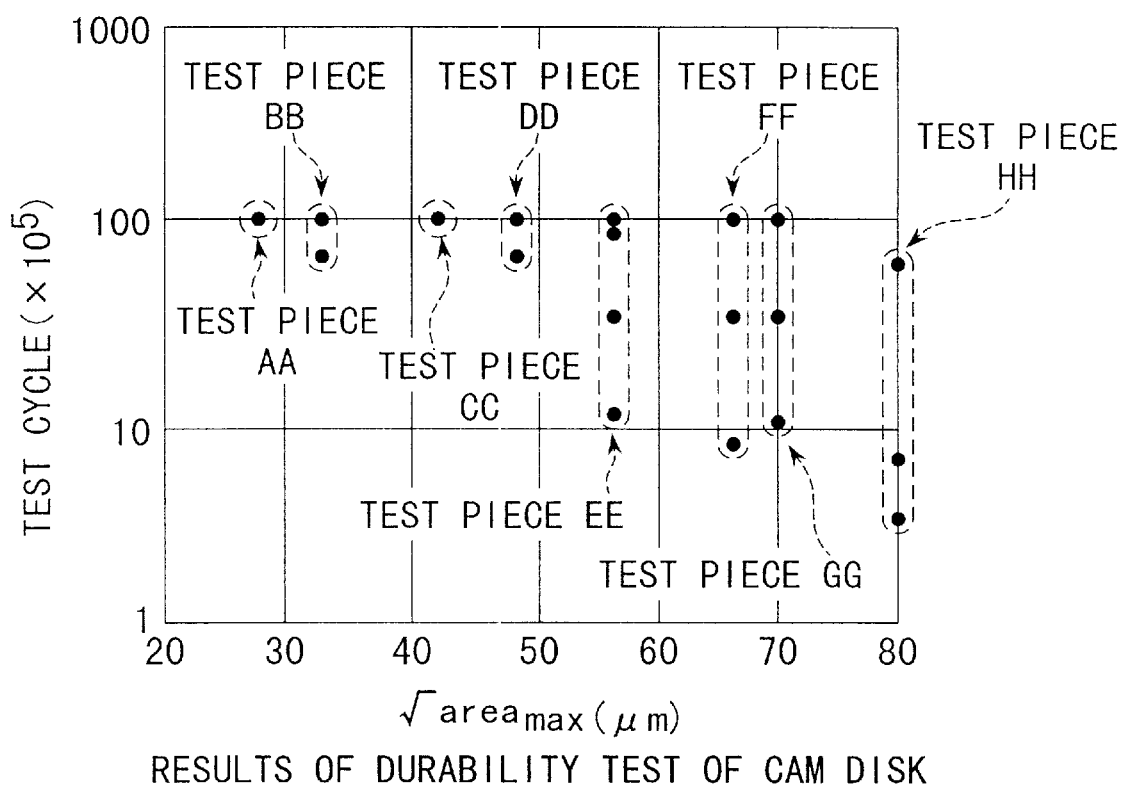
FIG. 11 shows results of durability tests of the cam disk of the toroidal type continuously variable transmission.
Figure 12:
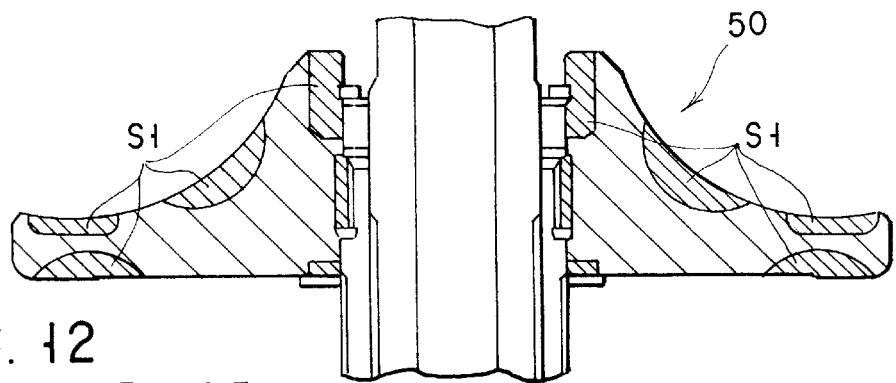
FIG. 12 shows an input/output disk of a conventional toroidal type continuously variable transmission.
Figure 13:
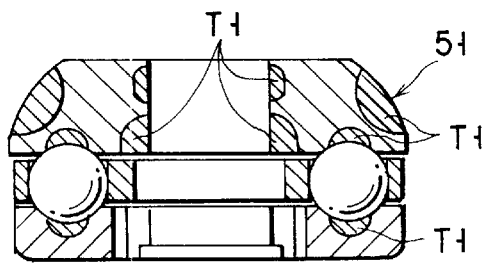
FIG. 13 shows a power roller of a conventional toroidal type continuously variable transmission.
Figure 14:
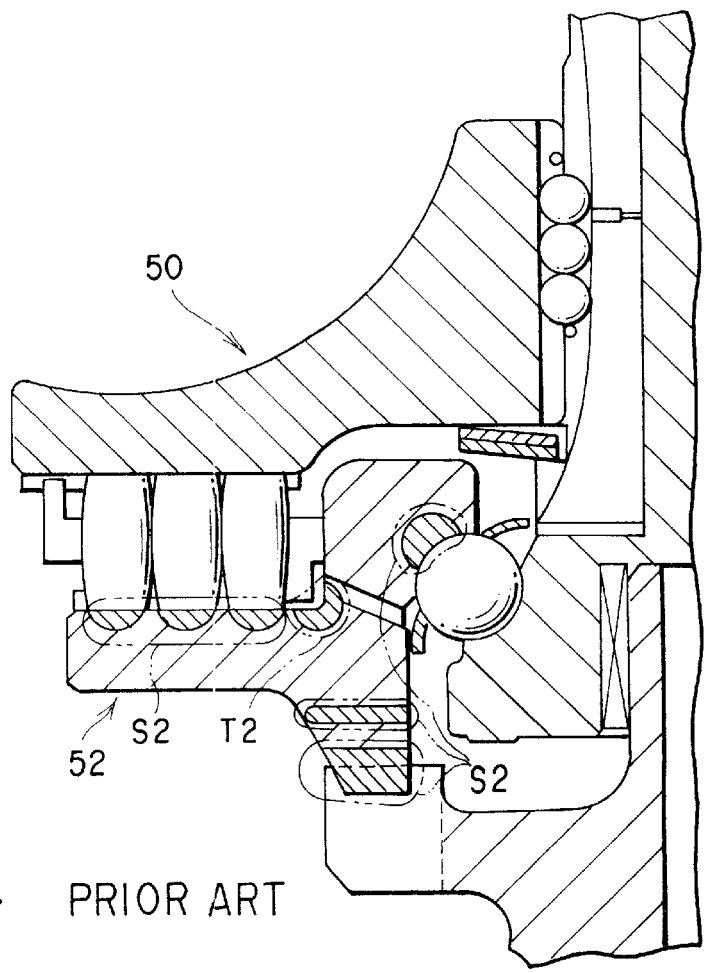
FIG. 14 is an enlarged cross-sectional view showing part of a cam disk of a conventional toroidal type continuously variable transmission.

According to the test results shown in TABLE 3 and FIG. 11, it was found that test-pieces AA to DD, in which the estimation area S is 30000 mm² and the root $\sqrt{area_{max}}$ of the area of the maximum inclusion is 50 μm or less, do not greatly vary in durability life and have a relatively long durability life. Accordingly, it is possible to obtain the cam disk 4 of the toroidal type continuously variable transmission 30, which has a relatively long life, by using the material in which the root $\sqrt{area_{max}}$ of the area of the maximum inclusion, which is the estimation value obtained by the extremum statistical process wherein the estimation area S is set at 30000 mm², is 50 μm or less.

According to TABLE 3, it was found that test-pieces AA to EE, in which the estimation area S is 100000 mm² and the root $\sqrt{area_{max}}$ of the area of the maximum inclusion is 70 μm or less, do not greatly vary in durability life and have a relatively long durability life. Accordingly, it is possible to obtain the cam disk 4 of the toroidal type continuously variable transmission 30, which has a relatively long life, by using the material in which the root $\sqrt{area_{max}}$ of the area of the maximum inclusion, which is the estimation value obtained by the extremum statistical process wherein the estimation area S is set at 100000 mm², is 70 μm or less.

The above-mentioned SCM420 steel and SCr420 steel have compositions defined by JIS (Japanese Industrial Standard).

The present embodiment is directed to the high-cleanness steel suitable for mechanical components for use under severe conditions, such as input/output disks 2 and 3, power roller 10 and cam disk 4 of toroidal type continuously variable transmission 20, 30, to which great repeated bending stress and great repeated shearing stress are applied. The high-cleanness steel of the present invention is applicable not only to the toroidal type continuously variable transmission, but also to rotary components or sliding components such as an outer race, an inner race, a rotary element and a cam follower of an anti-friction bearing.

The present invention is also directed to high-cleanness steel that is suitable for material of the power rollers 10 incorporated in the toroidal type continuously variable transmissions 20 and 30. The high-cleanness steel according to the invention can be used also as material of the outer race 13 of the power roller bearing 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high-cleanness steel characterized in that a relationship between a size of a maximum inclusion in a test reference area $S_0$ measured by microscopic observation and a standardization variable y is subjected to an extremum statistical process, and an estimation value of the size, $\sqrt{area_{max}}$, of a maximum inclusion in an estimation area S=30000 mm², which is expressed by a relationship given by the following equation calculated by the extremum statistical process, is 50 μm or less:

$$\sqrt{area_{max}} = ay+b$$

where $\sqrt{area_{max}}$: a root of an area of a maximum inclusion present in said test reference area, y: a standardization variable, and a and b: constants, wherein the test reference area $S_0$ is an area of one test-piece for microscopic observation, an n-number of test-pieces are subjected to the microscopic observation, and when sizes, $\sqrt{area_{max}}$, of maximum inclusions obtained by the observation, are arranged in order from a smallest one, a standardization variable $y_j$ relative to a j-th $\sqrt{area_{max}}$ is expressed by $$y_j = -1n[-1n\{j/(n+1)\}]$$

and the standardization variable y relative to the estimation area S for estimating the size of the maximum inclusion is expressed by $$y = -1n[-1n\{(T-1)/T\}]$$

where T meets a relationship given by $$T = (S+S_0)/S_0.$$

2. The high-cleanness steel according to claim 1, wherein the test reference area $S_0$ is 300 mm² or more.

3. The high-cleanness steel according to claim 1, wherein the high-cleanness steel is formed in a rod, and a to-be-tested surface for actually measuring the maximum inclusion is defined within 40% cross sectional surface of rod, distance between a central line extending in a longitudinal direction of the steel and a cross sectional surface of the steel in the vicinity of the central line including the central line.

4. The high-cleanness steel according to claim 2, wherein the high-cleanness steel is formed in a rod, and a to-be-tested surface for actually measuring the maximum inclusion is defined within 40% cross sectional surface of rod, distance between a central line extending in a longitudinal direction of the steel and a cross sectional surface of the steel in the vicinity of the central line including the central line.

5. A high-cleanness steel characterized in that a relationship between a size of a maximum inclusion in a test reference area $S_0$ measured by microscopic observation and a standardization variable y is subjected to an extremum statistical process, and an estimation value of the size, $\sqrt{area_{max}}$, of a maximum inclusion in an estimation area $S=100000$ mm$^2$, which is expressed by a relationship given by the following equation calculated by the extremum statistical process, is 70 $\mu$m or less:

$$\sqrt{area_{max}} = ay+b$$

where $\sqrt{area_{max}}$: a root of an area of a maximum inclusion present in said test reference area, y: a standardization variable, and a and b: constants, wherein the test reference area $S_0$ is an area of one test-piece for microscopic observation, an n-number of test-pieces are subjected to the microscopic observation, and when sizes, $\sqrt{area_{max}}$, of maximum inclusions obtained by the observation, are arranged in order from a smallest one, a standardization variable $y_j$ relative to a j-th $\sqrt{area_{max}}$ is expressed by $$y_j = -1n[-1n\{j/(n+1)\}]$$

and the standardization variable y relative to the estimation area S for estimating the size of the maximum inclusion is expressed by $$y = -1n[-1n\{(T-1)/T\}]$$

where T meets a relationship given by $$T = (S+S_0)/S_0.$$

6. The high-cleanness steel according to claim 5, wherein the high-cleanness steel is formed in a rod, and a to-be-tested surface for actually measuring the maximum inclusion is defined within 40% cross sectional surface of rod, distance between a central line extending in a longitudinal direction of the steel and a cross sectional surface of the steel in the vicinity of the central line including the central line.

7. The high-cleanness steel according to claim 5, wherein the test reference area $S_0$ is 300 mm$^2$ or more.

8. The high-cleanness steel according to claim 4, wherein the high-cleanness steel is formed in a rod, and a to-be-tested surface for actually measuring the maximum inclusion is defined within 40% cross sectional surface of rod, distance between a central line extending in a longitudinal direction of the steel and a cross sectional surface of the steel in the vicinity of the central line including the central line.

9. A toroidal type continuously variable transmission comprising:

an input shaft rotated by a driving source;

an input disk supported on the input shaft;

an output disk supported on the input shaft and opposed to the input disk;

a power roller swingably provided between the input disk and the output disk and rotatably put in contact with both disks; and a compression device having a cam disk supported on the input shaft, wherein at least one of the input disk, the output disk, the power roller and the cam disk is formed of a high-cleanness steel, characterized in that in said high-cleanness steel a relationship between a size of a maximum inclusion in a test reference area $S_0$ measured by microscopic observation and a standardization variable y is subjected to an extremum statistical process, and an estimation value of the size, $\sqrt{area_{max}}$, of a maximum inclusion in an estimation area $S=30000$ mm$^2$, which is expressed by a relationship given by the following equation calculated by the extremum statistical process, is 50 $\mu$m or less:

$$\sqrt{area_{max}} = ay+b$$

where $\sqrt{area_{max}}$: a root of an area of a maximum inclusion present in said test reference area, y: a standardization variable, and a and b: constants, wherein the test reference area $S_0$ is an area of one test-piece for microscopic observation, an n-number of test-pieces are subjected to the microscopic observation, and when sizes, $\sqrt{area_{max}}$, of maximum inclusions obtained by the observation, are arranged in order from a smallest one, a standardization variable $y_j$ relative to a j-th $\sqrt{area_{max}}$ is expressed by $$y_j = -1n[-1n\{j/(n+1)\}]$$

and the standardization variable y relative to the estimation area S for estimating the size of the maximum inclusion is expressed by $$y = -1n[-1n\{(T-1)/T\}]$$

where T meets a relationship given by $$T = (S+S_0)/S_0.$$

10. The toroidal type continuously variable transmission according to claim 9, wherein the test reference area $S_0$ of the high-cleanness steel in a case of actually measuring the maximum inclusion by the microscopic observation is set at 300 mm$^2$ or more.

11. A toroidal type continuously variable transmission comprising:

an input shaft rotated by a driving source;

an input disk supported on the input shaft;

an output disk supported on the input shaft and opposed to the input disk;

a power roller swingably provided between the input disk and the output disk and rotatably put in contact with both disks; and a compression device having a cam disk supported on the input shaft, wherein at least one of the input disk, the output disk, the power roller and the cam disk is formed of a high-cleanness steel, characterized in that in said high-cleanness steel a relationship between a size of a maximum inclusion in a test reference area $S_0$ measured by microscopic observation and a standardization variable y is subjected to an extremum statistical process, and an estimation value of the size, $\sqrt{area_{max}}$, of a maximum inclusion in an estimation area $S=100000$ mm$^2$, which is expressed by a relationship given by the following equation calculated by the extremum statistical process, is 70 $\mu$m or less:

$$\sqrt{area_{max}} = ay + b$$

where $\sqrt{area_{max}}$: a root of an area of a maximum inclusion present in said test reference area, y: a standardization variable, and a and b: constants, wherein the test reference area $S_0$ is an area of one test-piece for microscopic observation, an n-number of test-pieces are subjected to the microscopic observation, and when sizes, $\sqrt{area_{max}}$, of maximum inclusions obtained by the observation, are arranged in order from a smallest one, a standardization variable $y_j$ relative to a j-th $\sqrt{area_{max}}$ is expressed by $$y_j = -1n[-1n\{j/(n+1)\}]$$

and the standardization variable y relative to the estimation area S for estimating the size of the maximum inclusion is expressed by $$y = -1n[-1n\{(T-1)/T\}]$$

where T meets a relationship given by $$T = (S+S_0)/S_0.$$

12. The toroidal type continuously variable transmission according to claim 11, wherein the test reference area $S_0$ of the high-cleanness steel in a case of actually measuring the maximum inclusion by the microscopic observation is set at 300 mm$^2$ or more.

* * * * *